US006989955B2

(12) United States Patent
Ziemer et al.

(10) Patent No.: US 6,989,955 B2
(45) Date of Patent: Jan. 24, 2006

(54) EFFICIENT TRANSITION FROM CLASS D TO LINEAR OPERATION IN DUAL-MODE VOICE COIL MOTOR CONTROLLERS

(75) Inventors: Kevin W. Ziemer, Plano, TX (US); Alaa Y. El-Sherif, Plano, TX (US); Gene Plutowski, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/856,542

(22) Filed: May 28, 2004

(65) Prior Publication Data

US 2005/0264920 A1     Dec. 1, 2005

(51) Int. Cl.
*G11B 21/02*     (2006.01)
(52) U.S. Cl. .................................... 360/75; 360/77.02
(58) Field of Classification Search ..................... None
See application file for complete search history.

(56) References Cited

U.S. PATENT DOCUMENTS

| | | | |
|---|---|---|---|
| 5,838,515 A | 11/1998 | Mortazavi et al. | |
| 6,374,043 B1 | 4/2002 | El-Sherif et al. | |
| 6,542,324 B1 * | 4/2003 | Galbiati et al. | ............... 360/75 |
| 2002/0181142 A1 * | 12/2002 | Kokami et al. | .......... 360/77.02 |

* cited by examiner

*Primary Examiner*—David Hudspeth
*Assistant Examiner*—Jason Olson
(74) *Attorney, Agent, or Firm*—W. Daniel Swayze, Jr.; W. James Brady; Frederick J. Telecky, Jr.

(57) ABSTRACT

A dual-mode positioning driver for a voice coil motor in a disk drive system is disclosed. Linear prestage drivers and pulse-width-modulated prestage drivers are both coupled to power transistors arranged in an "H" bridge for driving the voice coil motor. The positioning driver is thus operable to drive the power transistors in either a linear mode or a pulse-width-modulated class D mode. In a transition period while switching from the pulse-width-modulated mode to linear mode, comparators compare the phase voltages in the "H" bridge with a reference voltage. The outputs of the comparators are applied to the PWM output amplifiers to drive the power transistors, so that the phase voltages are preconditioned toward their linear bias points. Discontinuities in the drive current through the voice coil motor are minimized as a result.

22 Claims, 3 Drawing Sheets

EFFICIENT TRANSITION FROM CLASS D TO LINEAR OPERATION IN DUAL-MODE VOICE COIL MOTOR CONTROLLERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of motor control, and is more specifically directed to control of voice coil motors as used in computer disk drive controllers.

As is evident in the industry, the magnetic disk drive remains the dominant technology for mass read/write storage in modern computers, including both desktop workstations and also portable "laptop" computers. Magnetic disk drives are now also popular in smaller scale portable systems, such as portable audio systems and players.

Modern disk drives typically include a "spindle" motor and a "voice coil" motor. The spindle motor spins the magnetic disks during operation, so that sectors at a given radius of the disk pass by the data transducer, or read/write "head". The "voice coil" motor radially positions the data transducer at the radial positions of the magnetic disk surface that correspond to the track locations to which data are being written or from which data are being read. Typically, the data transducer is at the end of a positioning arm that pivots across the surface of the spinning magnetic disk, from a pivot point outside of the circumference of the magnetic disk, so that pivoting of the positioning arm changes the radial position of the data transducer over the magnetic disk surface. The voice coil motor controls the pivoting of the positioning arm, and thus the track location of the data transducer.

Voice coil motor controller circuitry generally provides drive signals to the voice coil motor through a pair of output drivers, typically including a positive-side driver and a negative-side driver, connected on opposite sides of the voice coil motor. In operation, the positioning arm is pivoted in one direction by the positive side driver driving current through the voice coil motor to the negative side driver, and pivoted in the opposite direction by the negative side driver driving current through the voice coil motor to the positive side driver.

U.S. Pat. No. 6,374,043, issued Apr. 16, 2002, assigned to Texas Instruments Incorporated and incorporated herein by this reference, describes a voice coil motor driver and controller. This conventional voice coil motor driver includes a pair of driver transistors for each of the positive side and negative side voice coil motor drivers, and controls these driver pairs to operate in continuous and linear Class-AB mode around the driver crossover point.

Dual-mode voice coil motor control is known in the art. By way of further background, U.S. Pat. No. 5,838,515 describes a dual mode voice coil motor driver that operates in a pulse-width-modulated ("Class D") mode and also in a linear mode. As well known in the art, the "track following" operating mode of the voice coil motor maintains the data transducer at a desired track location, and the "track seek" operating mode moves the positioning arm from one track location to another. This reference describes that power dissipation in the voice coil motor drivers is reduced by switching the voice coil motor driver from a linear mode into a pulse-width-modulated mode at the onset of a deceleration phase of the seek trajectory. This reference discloses that the driver is switched back to linear mode as the positioning actuator moves the read/write head toward its intended destination track, so that the driver is operated in a linear, constant current mode during track following.

It is believed that other disk drive systems may associate these two voice coil motor drive modes (linear and pulse-width-modulated drive) with different disk drive operations. From the standpoint of the voice coil motor controller, the availability of the two drive modes provides the disk drive system implementer with a great deal of flexibility.

It has been discovered, in connection with this invention, that the transition of the voice coil motor driver from a pulse-width-modulation mode to the linear operation mode can produce discontinuities in the current through the voice coil motor. These current discontinuities result in errors in the positioning arm motion, which are especially undesirable when occurring in the deceleration phase of the track seek operation. Track settle failures can result as the data transducer is approaching the desired disk track, causing increased seek settling times and, in severe cases, errors in data write and data read operations.

BRIEF SUMMARY OF THE INVENTION

It is therefore an object of this invention to provide a dual mode motor controller in which discontinuities in the transitions from a class D, pulse-width-modulated, drive mode to a linear drive mode are greatly reduced.

It is a further object of this invention to provide such a dual mode motor controller that is especially well-suited for control of voice coil motors in magnetic disk drives.

It is a further object of this invention to provide such a dual mode motor controller in which a mixed-mode drive mode is made available, without transition discontinuities in the motor current.

Other objects and advantages of this invention will be apparent to those of ordinary skill in the art having reference to the following specification together with its drawings.

The present invention may be implemented into a dual mode power controller, such as a voice coil motor controller for a disk drive, having a bridge output driver for driving current in one of two directions through a load, such as a voice coil motor. Multiplexers drive the input signals to the output pulse-width-modulator (PWM) drivers, with either the PWM control signals generated by a PWM controller, or with the output of comparators. Each comparator compares the voltage at a voice coil motor terminal (referred to as the phase voltage) with a reference voltage, such as at a midpoint. The output of the comparator thus corresponds to a PWM-like control signal that, when applied to the PWM drivers, precondition the phase voltages toward a midpoint voltage such as provided in linear drive mode. Both the comparator-driven PWM control and linear drive can be enabled, during a mixed-mode operation period, prior to the linear drive control circuitry taking over.

DETAILED DESCRIPTION OF THE INVENTION

The present invention will be described in connection with its preferred embodiment, namely as implemented into a controller for a voice coil motor (VCM) as implemented into a disk drive, because it is contemplated that this invention is especially beneficial in such an application. However, it is also contemplated that the invention will also be beneficial in other applications, for example in driver circuits that have the capability of operating in multiple modes (i.e., multiple amplifier classes). Accordingly, it is to be understood that the following description is provided by way of example only, and is not intended to limit the true scope of this invention as claimed.

Figure 1:
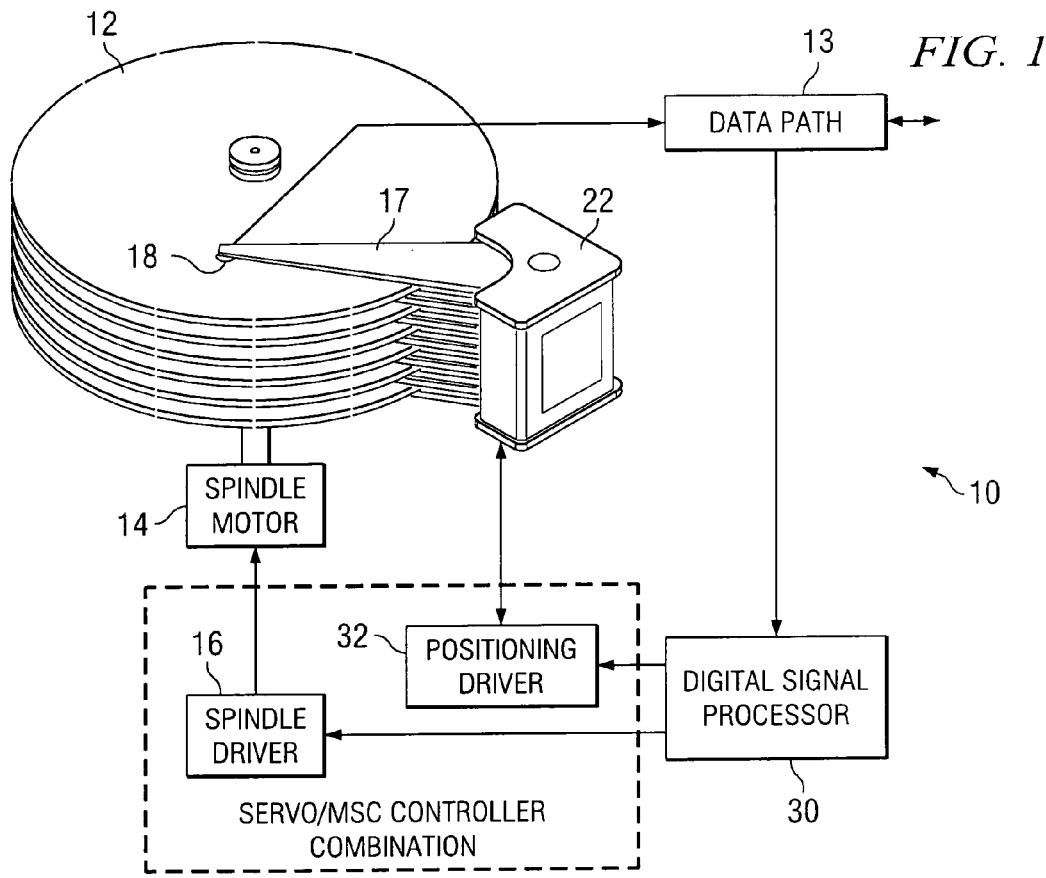
FIG. 1 is an electrical diagram, in block form, of a disk drive system constructed according to the preferred embodiment of the invention.

FIG. 1 generically illustrates disk drive system 10 constructed according to the preferred embodiment of the invention. Disk drive system 10 includes one or more magnetic media disks 12 that are rotated by spindle motor 14 in response to spindle driver circuit 16. Data transducer 18 is the read/write head of disk drive system 10, and is disposed at the end of positioning arm 17. In the multiple disk case shown in FIG. 1, multiple positioning arms 17 are provided, each having one or more data transducers 18. Voice coil motor (VCM) 22 operates to pivot positioning arm 17 to locate data transducer 18 at selectable radial tracks of disk 12. These radial tracks of disk 12 are contain track identification data, location information, and synchronization data that are used for operation of disk drive system 10. Data transducer 18 is used both to record ("write") user data to and read user data back from the disk, to detect signals that identify the tracks and sectors at which data are written, and to detect servo bursts that enable the head to be properly laterally aligned with the tracks of the disk.

Analog electrical signals that are generated by the head 18 in response to the magnetic signals recorded on disk 12 are forwarded to data path 13 for eventual communication to and from the host computer system (not shown). Servo signals that are prerecorded on the disk 12, in either digital or analog form, are detected and demodulated by one or more servo demodulator circuits (not shown) and processed by a digital signal processor (DSP) 30 to control the position of the data transducer 18 via positioning driver circuit 32. Positioning driver circuit 32 may be embodied within a common microcontroller with spindle driver circuit 16, which controls spindle motor 14. Positioning driver circuit 32 may also be integrated with other circuitry within disk drive system 10 as desired.

Figure 2:
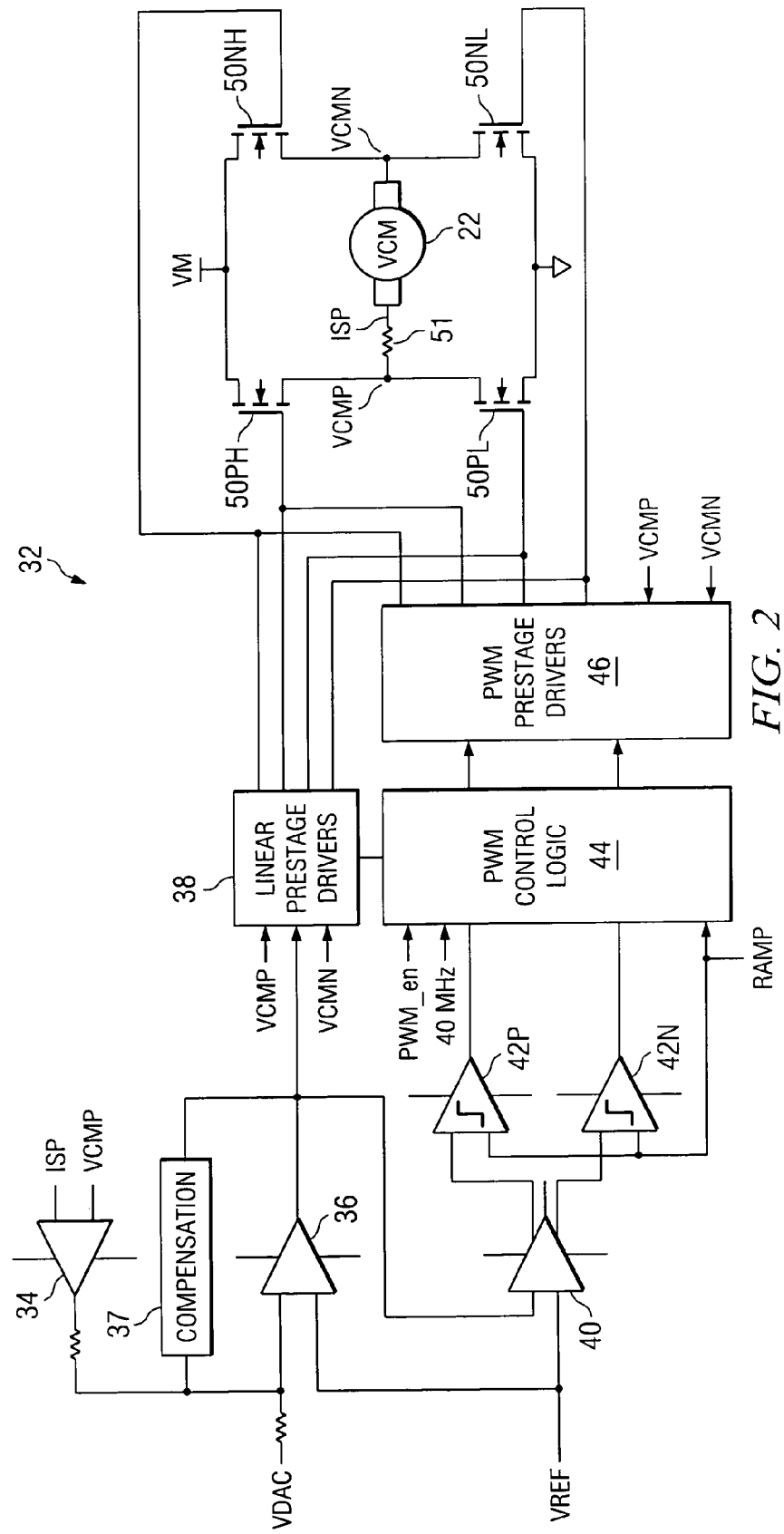
FIG. 2 is an electrical diagram, in block and schematic form, of voice coil motor controller and output drive circuitry of the disk drive system of FIG. 1, constructed according to the preferred embodiment of the invention.

Referring now to FIG. 2, the construction of positioning driver circuit 32, in combination with voice coil motor (VCM) 22 itself, according to the preferred embodiment of the invention will now be described. As will be evident from this description, positioning driver circuit 32 is dual-mode, in that it includes both linear and pulse-width-modulated (or class-D) driver modes.

Power transistors 50 are arranged in the conventional "H" bridge for driving current through VCM 22. The positive side drive is provided by transistors 50PH, 50PL, which are both n-channel power metal-oxide-semiconductor (MOS) transistors in this embodiment of the invention; as well known in the art, complementary MOS (CMOS) technology may also be used, if desired, for driving VCM 22, in which case transistor 50PH would be a p-channel MOS transistor. The source-drain paths of positive side transistors 50PH, 50PL are connected in series between power supply voltage VM and ground. Similarly, the negative side drive is provided by transistors 50NH, 50NL, which also have their source-drain paths connected in series between power supply voltage VM and ground. Voice coil motor 22 is connected between node VCMP at the source of transistor 50PH and the drain of transistor 50PL, and node VCMN at the source of transistor 50NH and the drain of transistor 50NL. The voltages at nodes VCMP, VCMN are commonly referred to in the art as the "phase" voltages. Current sense resistor 51 is connected in series with VCM 22, with sense node ISP between resistor 51 and VCM 22.

In general, as well known in the art, the relative drive applied to the gates of transistors 50 determines the current polarity and magnitude through VCM 22. For example, if the gates of positive side drive transistors 50PH, 50PL are biased so that transistor 50PH is turned on relatively hard as compared to transistor 50PL, with the gates of negative side drive transistors 50NH, 50NL biased so that transistor 50NL is turned on relatively hard relative to transistor 50NH, the phase voltage at node VCMP will be higher than the phase voltage at node VCMN. This will result in a current sourced through transistor 50PH, conducted through VCM 22, and sunk through transistor 50NL, which will cause VCM 22 to pivot positioning arm 17 in one direction. Conversely, if the gates of positive side drive transistors 50PH, 50PL are biased so that transistor 50PL is turned on relatively hard as compared to transistor 50PH, with the gates of negative side drive transistors 50NH, 50NL biased so that transistor 50NH is turned on relatively hard relative to transistor 50NL, the phase voltage at node VCMN will be higher than the phase voltage at node VCMP. This will result in a current sourced through transistor 50NH, conducted through VCM 22, and sunk through transistor 50PL, which will cause VCM 22 to pivot positioning arm 17 in an opposite direction.

Accordingly, the voltages applied to the gates of transistors 50 control the polarity and magnitude of current conducted through VCM 22. It is this function that positioning driver circuit 32 accomplishes in disk drive system 10 of FIG. 1.

Referring again to FIG. 2, on the linear side of positioning driver circuit 32, current sense amplifier 34 receives the voltages at nodes VCMP and ISP at its inputs, and produces a signal corresponding to the voltage drop across resistor 51, and thus corresponding to the current through VCM 22. This signal is summed with a control voltage VDAC at an input of error amplifier 36; the other input of error amplifier 36 receives a reference voltage VREF. Error amplifier 36 includes compensation feedback network 37 connected between its output and input, for stability of operation as known in the art. The output of error amplifier 36 is an error signal corresponding to the difference between the desired voltage VDAC summed with a voltage corresponding to the instantaneous current level through VCM 22, relative to the reference voltage VREF. This error signal is applied to linear prestage drivers 38, along with feedback signals corresponding to the phase voltages at nodes VCMP, VCMN. In response to the error signal and the phase voltages, linear prestage drivers 38 drive the gates of bridge transistors 50PH, 50PL, 50NH, 50NL with voltages that define the current through VCM 22, in turn controlling the motion of positioning arm 17 and transducer 18 (FIG. 1) in seeking or following a desired track location on disk 12.

Additional detail regarding the construction and operation of linear prestage drivers 38, as may be used in connection with this invention, is provided in U.S. Pat. No. 6,374,043, commonly assigned with this application and incorporated herein by this reference. It is also contemplated that other architectures of linear drivers for voice coil motor 22 may alternatively be used in connection with this invention.

On the PWM side of positioning driver circuit 32, the error signal from error amplifier 36 is forwarded to one input of differential amplifier 40; the second input of differential amplifier 40 receives the reference voltage VREF. Differential amplifier 40 generates a differential output signal corresponding to the difference between the error signal from error amplifier 36 and the reference voltage VREF. One output of differential amplifier 40 is applied to an input of comparator 42P, while the other output of differential amplifier 40 is applied to an input of comparator 42N. Each of comparators 42P, 42N compare these inputs to ramp signal RAMP, which is typically a sawtooth or triangle wave at a selected switching frequency, as used in conventional PWM and class D amplifier control. Each of comparators 42P, 42N thus each generate full-rail output signals responsive to the comparison between its input received from differential amplifier 40 and ramp signal RAMP, and provide the resulting logic levels to PWM control logic 44. PWM control logic 44 is enabled by pulse-width-modulation enable signal PWM_en, and generates a pair of control signals that are applied to PWM prestage drivers 46, which generate drive signals that are applied to the gates of transistors 50. In this manner, transistors 50 in the "H" bridge produce pulse-width-modulated current that is applied to VCM 22, and that control its pivoting and motion. According to the preferred embodiment of this invention, PWM prestage drivers 26 also receive phase voltages VCMP, VCMN for control of the drive applied to transistors 50 during the transition from PWM drive mode to linear drive mode, as will now be described relative to FIG. 3.

Figure 3:
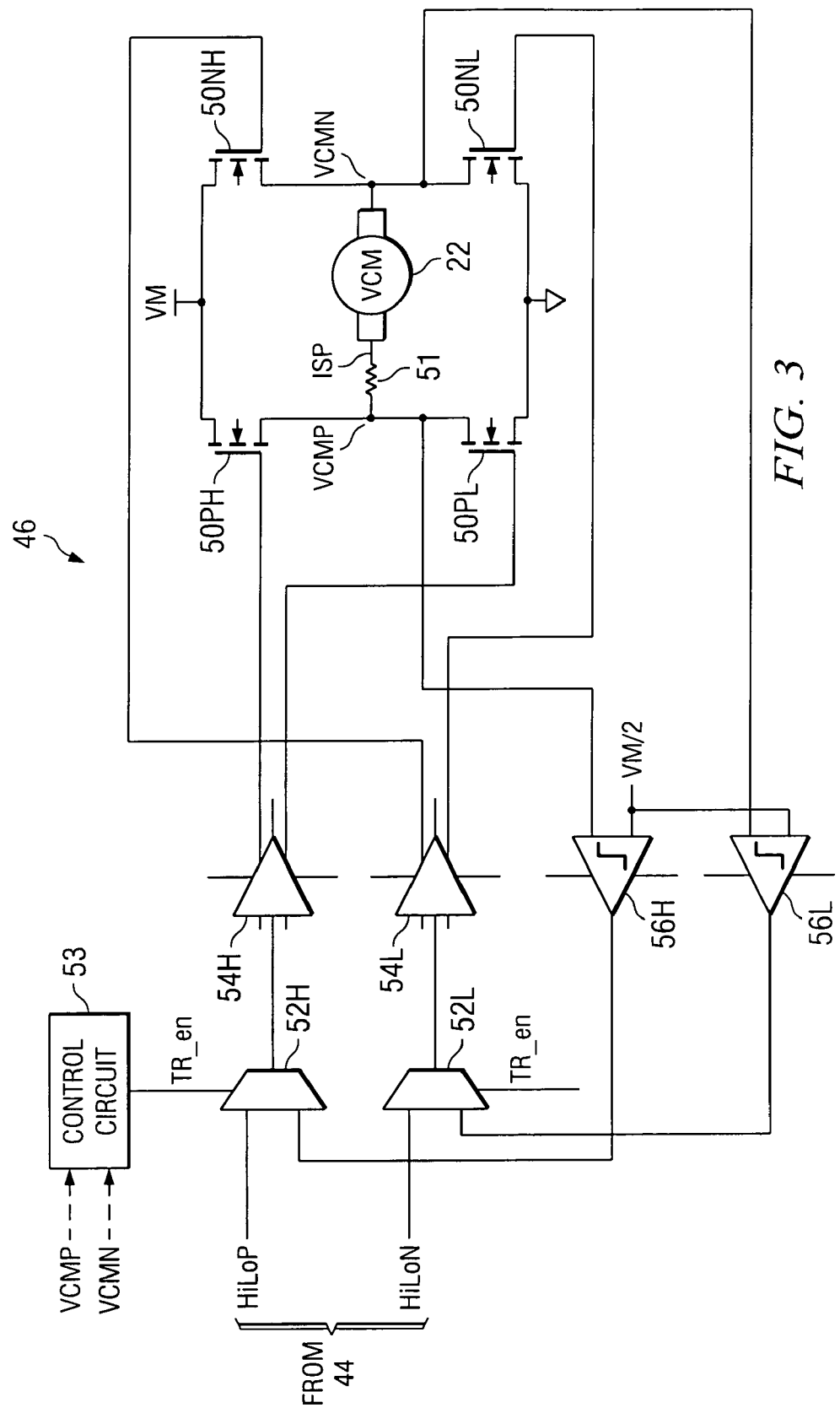
FIG. 3 is an electrical diagram, in block and schematic form, of the pulse-width-modulated drive and control circuitry in the circuitry of FIG. 2, constructed according to the preferred embodiment of the invention.

FIG. 3 illustrates the construction of PWM prestage drivers 26, in cooperation with power transistors 50 and VCM 22, according to the preferred embodiment of the invention. As shown in FIG. 3, PWM control signals HiLoP, HiLoN from PWM control logic 44 are respectively applied to one input of each of multiplexers 52H, 52L. Multiplexers 52H, 52L are each controlled by a control signal TR_en, generated by control circuit 53, which may reside in PWM control logic 44 or in other logic in positioning driver circuit 32 that controls selection of the linear and PWM modes. Control circuit 53 may include a timer for asserting and maintaining control signal TR_en for a selected time duration, or alternatively may maintain control signal TR_en in response to the phase voltages at nodes VCMP, VCMN. The output of multiplexers 52H, 52L are applied to output PWM drivers 54H, 54L, respectively; in PWM mode, multiplexers 52H, 52L select PWM control signals HiLoP, HiLoN for application to their respective output PWM drivers 54H, 54L. Output PWM driver 54H generates drive signals applied to the gates of positive side power transistors 50PH, 50PL, and output PWM driver 54L generates drive signals applied to the gates of negative side power transistors 50NH, 50NL.

According to the preferred embodiment of the invention, comparators 56H, 56L control the drive applied to power transistors 50 during the transition from PWM mode to linear drive mode. Comparator 56H has a first input receiving the phase voltage at node VCMP, and a second input receiving a reference voltage. The reference voltage applied to comparator 56H (and to comparator 56L as will be described below) is the voltage toward which the phase voltages are preferably driven in effecting the transition from PWM mode to linear mode. In this example, this voltage is one-half the power supply voltage applied to power transistors 50 in the "H" bridge, i.e., the voltage VM/2. Similarly, comparator 56L receives the phase voltage at node VCMN at a first input, and the reference voltage (e.g., VM/2) at a second input.

The output of comparator 56H is applied to a second input of multiplexer 52H, and the output of comparator 56L is applied to a second input of multiplexer 52L. Multiplexers 52H, 52L are controlled by control signal TR_en, as described above. According to this preferred embodiment of the invention, control signal TR_en controls multiplexers 52H, 52L to respectively select the output of comparators 56H, 56L for application to output PWM drivers 54H, 54L, respectively, during the transition from PWM mode to linear mode, and in PWM mode to select the incoming PWM control signals HiLoP, HiLoN from PWM control logic 44 for application to output PWM drivers 54H, 54L, respectively. During linear mode, it is contemplated that other gating logic and control signals (not shown) are operable to disable or decouple PWM prestage drivers 46 from power transistors 50. Preferably, as will be described below, positioning driver 32 operates in a mixed mode during the transition from PWM to linear modes, with both PWM and linear drive signals applied to the gates of power transistors 50.

In normal operation, positioning driver 32 operates to pivot positioning arm 17, and thereby move data transducer 18, to tracks of disk 12 corresponding to disk memory addresses generated by the host computer and its disk operating system. The two modes (PWM and linear) provided by positioning driver 32 according to this embodiment of the invention, are contemplated to be useful in the various operations such as track seek, deceleration at the end of a track seek operation, and track follow, that are useful in accomplishing access to the addressed tracks of disk 12. For example, as described above in the Background of the Invention, the PWM (or class D) drive mode of positioning driver 32 may be used for the track seek and track follow operations, with the linear drive mode of positioning driver 32 used in the deceleration phase of the track seek operation, as data transducer 18 approaches the desired track position. Alternatively, the PWM and linear drive modes may be useful in other combinations, for example in using the linear drive mode for track follow, and the PWM drive mode for track seek. It will be understood by those skilled in the art, having reference to this specification, that the particular disk drive operations associated with the PWM and linear drive modes for positioning driver 32 may be useful in other combinations, for example in using the linear drive mode for track follow, depending on the particular performance requirements and disk drive system applications.

Referring to FIGS. 2 and 3 in combination, the operation of PWM prestage drivers 46 in combination with power transistors 50 according to the preferred embodiment of the invention will now be described. In the PWM or class D amplifier mode, PWM control logic 44 generates PWM control signals HiLoP, HiLoN, according to the comparison of the error signal from error amplifier 36 against reference voltage VREF, as pulse-width-modulated by comparators 42P, 42N (relative to ramp signal RAMP). In this PWM mode, control signal TR_en is de-asserted by PWM control logic 44, which controls multiplexers 52H, 52L to pass PWM control signals HiLoP, HiLoN to output PWM drivers 54H, 54L, respectively. Output PWM driver 54H applies voltages to the gates of power transistors 50PH, 50PL to control the phase voltage at node VCMP, and output PWM driver 54L applies voltages to the gates of power transistors 50NH, 50NL to control the phase voltage at node VCMN. In this mode, it is contemplated that the phase voltages at nodes VCMP, VCMN are driven rail-to-rail, in class D pulse-width-modulated fashion. The duty cycle and polarity of the phase voltages determine the average current through VCM 22, and thus control the positioning of positioning arm 17 and its data transducer 18.

As mentioned above, in a dual mode VCM positioning system such as shown in FIGS. 2 and 3, transitions will be made from PWM mode to linear mode, and vice versa. However, it has been observed, according to this invention, that the phase voltages at nodes VCMP, VCMN, and also the voltages at the gates of each of power transistors 50 in the "H" bridge, are often at levels during the PWM drive mode that are quite different from linear mode operating levels. Accordingly, discontinuities in the current through VCM 22 have been observed when the transition from the PWM drive mode to the linear drive mode is abrupt. It has been further observed that these discontinuities in the phase and gate voltages appear in the error voltages, for example as measured by current sense amplifier 34 and by error amplifier 36. The error due to these transition discontinuities has been observed to build over time once the linear mode is abruptly entered, causing track settle errors and thus increased track seek settling times. In severe cases, these discontinuities can lead to errors in data write and data read operations.

According to the preferred embodiment of the invention, comparators 56 and multiplexers 52 serve to precondition the voltages at the gates of power transistors 50, and also the phase voltages at nodes VCMP, VCMN, in the transition from PWM drive mode to linear drive mode. This preconditioning occurs quite quickly, according to the preferred embodiment of the invention, and the reduction in the sensing errors in fact leads to improved disk performance.

Accordingly, at the end of the current PWM mode operation, for example at the beginning of a deceleration phase in a track seek operation when the dual-mode positioning driver 32 is to switch to a linear mode, PWM control logic 44 asserts the TR_en control signal to multiplexers 52H, 52L. Multiplexers 52H, 52L accordingly select the outputs of comparators 56H, 56L for application to output PWM drivers 54H, 54L, respectively, during this transition period. Also during this transition period, as will be described below, linear prestage drivers 38 also preferably drive the gates of power transistors 50, providing a mixed-mode (PWM and linear) drive to VCM 22.

For example, during this transition period, comparator 56H compares the phase voltage at node VCMP against reference voltage VM/2, and generates a rail-to-rail signal at its output corresponding to the result of this comparison. Similarly, also during the transition, comparator 56L compares the phase voltage at node VCMN against reference voltage VM/2, and generates a rail-to-rail signal at its output corresponding to the result of this comparison. The goal of comparators 56H, 56L is to generate output signals that cause output PWM drivers 54H, 54L to drive power transistors 50 toward the state at which the phase voltages are both at reference voltage VM/2. Accordingly, each of the PWM loops are preferably arranged as negative feedback loops. For example, if the phase voltage at node VCMP is higher than reference voltage VM/2 at the beginning of the transition period, the loop through comparator 56H, multiplexer 52H, and output PWM driver 54H preferably drives the gates of transistors 50PH, 50PL so that transistor 50PL is on, over time, longer than transistor 50PH is on, so that node VCMP is pulled lower. The loop of comparator 56L, multiplexer 52L, and output PWM driver 54L operates in similar fashion.

The TR_en control signal applied to multiplexers 52H, 52L is preferably asserted for a selected duration, for example as controlled by a timer in control circuit 53. Alternatively, control circuit 53 may include comparators or other circuitry for de-asserting control signal TR_en in response to the phase voltages at nodes VCMP, VCMN, for example as the phase voltages approach reference voltage VM/2. It is contemplated that other control schemes for determining when to de-assert control signal TR_en will be apparent to those skilled in the art having reference to this specification, as suitable for a particular implementation of this invention.

During the transition time while comparators 56H, 56L are controlling their respective output PWM drivers 54H, 54L, linear prestage drivers 38 also preferably drive the gates of power transistors 50. The outputs of linear prestage drivers 38 and output PWM drivers 54H, 54L are tied together at corresponding gate nodes, as evident from FIG. 2, and are compatible with one another. This mixed-mode operation, in which both prestage drivers 38, 46 are driving power transistors 40, further serves to precondition the gate and phase voltages, although it is contemplated that output PWM drivers 54H, 54L will tend to dominate linear prestage drivers 38 during this transition, mixed-mode, operation.

At the end of the transition period, either as timed out by control logic 53 or upon its sensing of adequate preconditioning of the phase voltages at nodes VCMP, VCMN, PWM prestage drivers 46 are disabled from driving the gates of power transistors 50. Linear prestage drivers 38 (FIG. 2) instead control these gate voltages, and thus the phase voltages at nodes VCMP, VCMN and, accordingly, the magnitude and polarity of the current through VCM 22. Because of the preconditioning of the gate and phase voltages, by operation of comparators 56 and output PWM drivers 54, to voltages approaching the voltages at which these nodes will be biased in the linear mode, the discontinuities in the operation of power transistors 50 in making the transition between the PWM and linear modes, and the resulting error, are much reduced than in conventional dual-mode VCM systems.

Figure 4A:
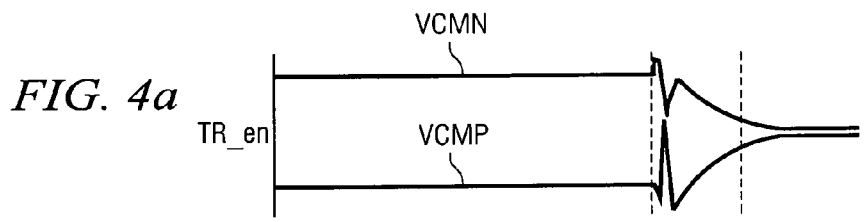
FIGS. 4a through 4c are timing diagrams illustrating the operation of the voice coil motor controller and output drive circuitry of FIGS. 2 and 3, according to the preferred embodiment of the invention.
Figure 4B:
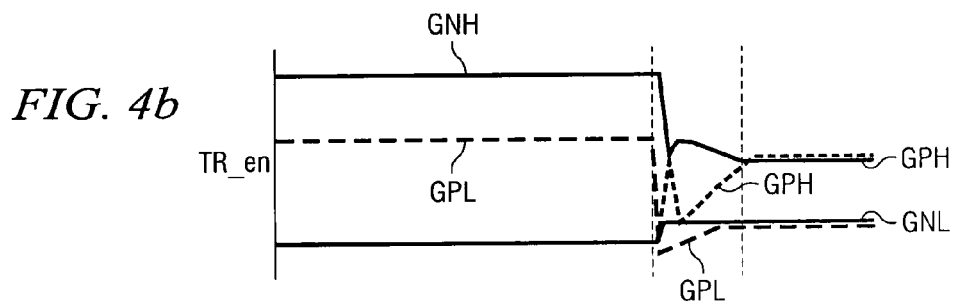
Figure 4C:
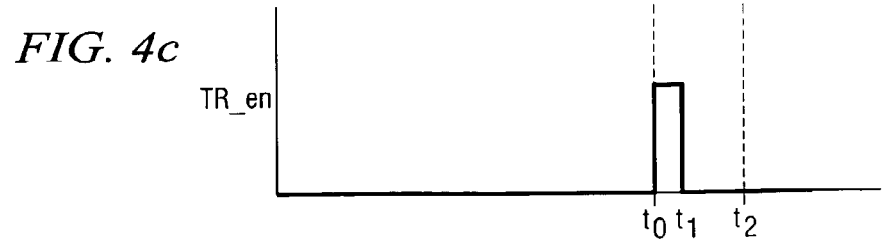

FIGS. 4a through 4c illustrate an example of the operation of positioning driver circuit 46 according to the preferred embodiment of the invention. FIG. 4a illustrates the phase voltages at nodes VCMP, VCMN. FIG. 4b illustrates voltages GPH, GPL, GNH, GNL at the gates of transistors 50PH, 50PL, 50NH, and 50NL, respectively. FIG. 4c illustrates the timing of control signal TR_en, which is asserted from time $t_0$ to time $t_1$. It is contemplated that the overall duration from time $t_0$ to time $t_1$ may be on the order of 500 nsec to 1.5 μsec, for example.

In FIGS. 4a through 4c, at times prior to time to, positioning driver circuit 46 and power transistors 50 are operating in PWM mode (pulses at the various nodes are not shown in the Figures, for the sake of clarity). In this example, the last PWM pulse immediately prior to time $t_0$ has driven the gates of transistors 50NH and 50PL high, and the gates of transistors 50PH and 50NL low, such that node VCMN is high and node VCMP is low. A current flowing from right-to-left (FIGS. 2 and 3) through VCM 22 is thus being driven by this last PWM pulse.

At time $t_0$, the transition from the PWM drive mode to the linear drive mode begins, as control signal TR_en is asserted. Because the phase voltage at node VCMN is high relative to reference voltage VM/2 (and, conversely, because the phase voltage at node VCMP is low relative to reference voltage VM/2), comparators 56H, 56L generate output signals that cause output PWM drivers 54H, 54L to pulse the gates of transistors 50PH, 50NL high and the gates of transistors 50NH, 50PL low, as shown in FIG. 4b by voltages GPH, GNH, GPL, respectively. These pulses discharge phase voltage VCMN and charges phase voltage VCMP during the transition time from time $t_0$ to time $t_1$. As mentioned above, also during this time, linear prestage drivers 38 are also driving the gates of transistors 50 with linear mode bias voltages, which tends to limit the excursions of the gate voltages.

At the end of the transition period at time $t_1$, control signal TR_en is de-asserted. The action of comparators 56 and output PWM drivers 54 during the transition period have preconditioned the phase voltages VCMP, VCMN and the gate voltages GPH, GPL, GNH, GNL so that they can more rapidly reach their linear drive mode levels, which occurs at about time $t_2$. By way of simulation, it is expected that the linear levels are reached, at time $t_2$, after about on the order of 15 μsec, according to the preferred embodiment of the invention.

Because of the preconditioning of the gate and phase voltages in the "H" bridge of power transistors 50 according to the preferred embodiment of the invention, the gate and phase voltages are driven much closer to their linear voltage levels, by the time that the linear drive mode takes over, than in conventional circuits. Discontinuities in the current through the voice coil motor and the resulting erroneous motion of the positioning arm, which in turn cause sensing errors that perpetuate through the linear drive mode feedback, are thus greatly reduced. It is contemplated that this invention will result in improved accuracy and performance in the disk drive system or other system utilizing this invention, and can also enable the use of dual-mode drivers for other operations in the implementing systems.

The preferred embodiment of the invention has been described in connection with its contemplated application of control of a voice coil motor in a disk drive system. As mentioned above, however, it is contemplated that this invention may have benefit in other applications beyond motor control, and beyond its use in a disk drive system. For example, it is contemplated that this invention may also be used in connection with a dual or multiple mode output amplifier or drive circuit in which only a single driver pair is used, rather than the positive-side and negative-side driver pairs as described above. It is contemplated that those skilled in the art having reference to this specification will be readily able to utilize this invention in such other applications, such uses intended to be within the scope of this invention as claimed.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A multiple-mode driver circuit, comprising:
  pulse-width-modulation circuitry, for generating first and second pulse-width modulated signals;
  a first driver pair comprising first and second transistors having conduction paths connected in series between a power supply voltage and a ground voltage, and defining a first phase node at the connection between the conduction paths of the first and second transistors, each of the first and second transistors having a control terminal;
  a first pulse-width-modulation driver, having an input and having outputs coupled to the control terminals of the first and second transistors;
  a first comparator, having a first input coupled to the first phase node, and having a second input for receiving a reference voltage; and
  a first multiplexer, having a first input coupled to receive the first pulse-width modulated signal, having a second input coupled to receive an output of the first comparator, having a control input, and having an output coupled to the input of the first pulse-width-modulation driver.

2. The circuit of claim 1, further comprising:
  a second driver pair comprising third and fourth transistors having conduction paths connected in series between the power supply voltage and a ground voltage, and defining a second phase node at the connection between the conduction paths of the third and fourth transistors, each of the third and fourth transistors having a control terminal;
  a second pulse-width-modulation driver, having an input and having outputs coupled to the control terminals of the third and fourth transistors;
  a second comparator, having a first input coupled to the second phase node, and having a second input for receiving a reference voltage; and
  a second multiplexer, having a first input coupled to receive the second pulse-width modulated signal, having a second input coupled to receive an output of the second comparator, having a control input, and having an output coupled to the input of the second pulse-width-modulation driver.

3. The circuit of claim 2, further comprising:
  a control circuit coupled to the control inputs of the first and second multiplexers, for controlling the first and second multiplexers.

4. The circuit of claim 3, wherein the control circuit comprises:
  a timer, for measuring a selected duration;
  circuitry for generating a control signal to control the first and second multiplexers to select their first inputs for coupling to their outputs for the selected duration.

5. The circuit of claim 3, wherein the control circuit comprises:
  comparator circuitry for measuring the voltages of the first and second phase nodes; and
  circuitry for generating a control signal to control the first and second multiplexers to select their first inputs for coupling to their outputs responsive to the comparator circuitry.

6. The circuit of claim 2, further comprising:
a load coupled between the first and second phase nodes.

7. The circuit of claim 1, further comprising:
a load coupled to the first phase node.

8. A method of driving a motor in a disk drive system, comprising:
generating pulse-width-modulated signals to drive a first pair of driver transistors to generate a first phase voltage at a load;
generating a first preconditioning signal responsive to a comparison of the first phase voltage with a reference voltage;
in a transition period, driving the first pair of driver transistors responsive to the first preconditioning signal;
after the transition period, driving the first pair of driver transistors in a linear mode.

9. The method of claim 8, further comprising:
generating pulse-width-modulated signals to drive a second pair of driver transistors to generate a second phase voltage at the load, the first and second phase voltages establishing a current through the load;
generating a second preconditioning signal responsive to a comparison of the second phase voltage with a reference voltage;
in the transition period, driving the second pair of driver transistors responsive to the second preconditioning signal;
after the transition period, driving the second pair of driver transistors in the linear mode.

10. The method of claim 8, wherein the generating step comprises:
applying pulse-width-modulated signals to a first output amplifier, the first output amplifier having outputs coupled to the first pair of driver transistors.

11. The method of claim 10, wherein the step of driving the first pair of driver transistors comprises:
applying the first preconditioning signal to the first output amplifier.

12. The method of claim 11, wherein the step of applying pulse-width-modulated signals to the first output amplifier comprises controlling a first multiplexer to couple the pulse-width-modulated signals to the first output amplifier;
and wherein the step of applying the first preconditioning signal to the first output amplifier comprises controlling the first multiplexer to couple the first preconditioning signal to the first output amplifier.

13. The method of claim 8, further comprising:
during the transition period, driving the first pair of driver transistors in the linear mode.

14. The method of claim 8, further comprising:
biasing the first pair of driver transistors with a power supply voltage;
wherein the reference voltage is about one-half the power supply voltage.

15. The method of claim 8, further comprising:
terminating the transition period.

16. The method of claim 15, further comprising:
measuring the duration of the transition period;
wherein the terminating step is performed responsive to the measured duration reaching a selected time duration.

17. The method of claim 15, further comprising:
measuring the first phase voltage;
wherein the terminating step is performed responsive to the first phase voltage reaching a selected voltage level.

18. A disk drive system, comprising:
a magnetic disk;
a positioning arm extended over the magnetic disk;
a data transducer mounted at a distal end of the positioning arm;
a voice coil motor coupled to a proximal end of the positioning arm, for pivoting the positioning arm;
a first driver pair comprising first and second transistors having conduction paths connected in series between a power supply voltage and a ground voltage, and defining a first phase node coupled to the voice coil motor at the connection between the conduction paths of the first and second transistors, each of the first and second transistors having a control terminal, and the first phase node;
a linear circuit for generating linear drive signals to the control terminals of the first and second transistors, in a linear drive mode;
pulse-width-modulation circuitry, for generating first and second pulse-width modulated signals;
a first pulse-width-modulation driver, having an input and having outputs coupled to the control terminals of the first and second transistors;
a first comparator, having a first input coupled to the first phase node, and having a second input for receiving a reference voltage;
a first multiplexer, having a first input coupled to receive the first pulse-width modulated signal, having a second input coupled to receive an output of the first comparator, having a control input, and having an output coupled to the input of the first pulse-width-modulation driver; and
a control circuit coupled to the control inputs of the first and second multiplexers, for controlling the first and second multiplexers.

19. The disk drive system of claim 18, further comprising:
a second driver pair comprising third and fourth transistors having conduction paths connected in series between the power supply voltage and a ground voltage, and defining a second phase node coupled to the voice coil motor at the connection between the conduction paths of the third and fourth transistors, each of the third and fourth transistors having a control terminal;
a second pulse-width-modulation driver, having an input and having outputs coupled to the control terminals of the third and fourth transistors;
a second comparator, having a first input coupled to the second phase node, and having a second input for receiving a reference voltage; and
a second multiplexer, having a first input coupled to receive the second pulse-width modulated signal, having a second input coupled to receive an output of the second comparator, having a control input, and having an output coupled to the input of the second pulse-width-modulation driver.

20. The disk drive system of claim 19, further comprising:
a control circuit coupled to the control inputs of the first and second multiplexers, for controlling the first and second multiplexers.

21. The disk drive system of claim 20, wherein the control circuit comprises:
  a timer, for measuring a selected duration;
  circuitry for generating a control signal to control the first and second multiplexers to select their first inputs for coupling to their outputs for the selected duration.

22. The disk drive system of claim 20, wherein the control circuit comprises:
  comparator circuitry for measuring the voltages of the first and second phase nodes; and
  circuitry for generating a control signal to control the first and second multiplexers to select their first inputs for coupling to their outputs responsive to the comparator circuitry.

* * * * *